(12) United States Patent
Motoyoshi et al.

(10) Patent No.: US 8,816,039 B2
(45) Date of Patent: Aug. 26, 2014

(54) COPOLYCARBONATE

(75) Inventors: Tetsuya Motoyoshi, Chiyoda-ku (JP); Masatoshi Ando, Chiyoda-ku (JP); Tsuyoshi Takeda, Chiyoda-ku (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 13/884,309

(22) PCT Filed: Nov. 10, 2011

(86) PCT No.: PCT/JP2011/076462
§ 371 (c)(1),
(2), (4) Date: Jun. 17, 2013

(87) PCT Pub. No.: WO2012/063965
PCT Pub. Date: May 18, 2012

(65) Prior Publication Data
US 2013/0261283 A1    Oct. 3, 2013

(30) Foreign Application Priority Data
Nov. 12, 2010    (JP) .................. 2010-253757

(51) Int. Cl.
*C08G 63/02* (2006.01)
*G02B 1/04* (2006.01)
*C08G 64/16* (2006.01)
*C08G 63/00* (2006.01)

(52) U.S. Cl.
CPC ............. *C08G 64/1608* (2013.01); *G02B 1/04* (2013.01); *C08G 64/1616* (2013.01)
USPC .......................................... 528/198; 528/196

(58) Field of Classification Search
USPC ................................. 528/196, 198
See application file for complete search history.

(56) References Cited

U.S. PATENT DOCUMENTS

| | | |
|---|---|---|
| 5,858,499 A | 1/1999 | Abe et al. |
| 6,265,523 B1 | 7/2001 | Nagai et al. |

FOREIGN PATENT DOCUMENTS

| | | |
|---|---|---|
| JP | 9-268225 | 10/1997 |
| JP | 11-343335 | 12/1999 |
| JP | 11-349679 | 12/1999 |
| JP | 2000-7777 | 1/2000 |
| JP | 2002-241485 | 8/2002 |
| JP | 2004-189858 | 7/2004 |

OTHER PUBLICATIONS

International Search Report issued Jan. 24, 2012 in International (PCT) Application No. PCT/JP2011/076462.
International Preliminary Report on Patentability issued May 14, 2013 and English translation of Written Opinion of the International Searching Authority issued Jan. 24, 2012 in International Application No. PCT/JP2011/076462.

*Primary Examiner* — Terressa Boykin
(74) *Attorney, Agent, or Firm* — Wenderoth, Lind & Ponack, L.L.P.

(57) ABSTRACT

The present invention provides a copolycarbonate that has a low photoelastic constant and has fewer foamed cells and that is in particular suitable for use in optical fields.
The present invention is a copolycarbonate containing 10 to 90 mol % of a unit (A) derived from spiroglycol and 90 to 10 mol % of a unit (B) derived from aromatic phenol and having terminals satisfying the following expressions (i) and (ii), $$0.0001 < (a)/(d) < 0.1 \quad \text{(i)}$$

$$0.02 < (b)/(d) < 0.8 \quad \text{(ii)}$$

wherein (a) is an amount of a terminal group derived from spiroglycol, (b) is an amount of a terminal group derived from aromatic phenol, and (d) is a total terminal group amount.

4 Claims, No Drawings

COPOLYCARBONATE

TECHNICAL FIELD

This invention relates to a copolycarbonate having a low photoelastic constant and high thermal stability.

BACKGROUND ART

Conventionally, since a copolycarbonate (to be referred to as "PC-A" hereinafter) obtained by reacting 2,2-bis(4-hydroxyphenyl)propane (to be referred to as "bisphenol A" hereinafter) with a carbonate precursor is excellent in transparency, heat resistance, mechanical properties and dimensional stability, it is used in many fields as an engineering plastic. In recent years, further, PC-A is finding developments in use in the fields of optical disks, films, lenses, etc., with taking advantage of its transparency.

When PC-A is used, however, it causes an optical strain and various problems when used in the optical fields since it has a high positive birefringence and a high photoelastic constant. For example, when used for an optical lens, it has a defect that a molded article has a large birefringence. When used as a retardation film, it has a problem that it undergoes a great change in birefringence due to a stress and hence causes light omission.

As one of solutions of the above problem, there is a report of a copolycarbonate using spiroglycol as an aliphatic diol (see Patent Document 1). Since a copolycarbonate using spiroglycol is poor in thermal stability as compared with generally used PC-A, it undergoes decomposition during extruding or molding and causes a silver streaking, foaming and burning. When such failures in appearance take place, a product loses its value.

As a method of improving thermal stability, there is reported a method of decreasing the nitrogen content of the spiroglycol to 9 ppm or less (see Patent Document 2), a method of adjusting the content of formyl group and/or aldehyde group of the spiroglycol to 100 ppm or less (see Patent Document 2) or a method of adjusting the melting Hazen color number of spiroglycol held in atmosphere at 260° C. for 5 hours to 40 or less (see Patent Document 4).

However, while attempts have been conventionally made to improve thermal stability, in reality no resin having sufficient thermal stability and having silver streaking, foaming and burning suppressed has been materialized.

(Patent Document 1) JP 09-268225 A
(Patent Document 1) JP 11-343335 A
(Patent Document 1) JP 11-349679 A
(Patent Document 1) JP 2000-007777 A

DISCLOSURE OF THE INVENTION

It is an object of this invention to propose a copolycarbonate which has a low photoelastic constant, in which the occurrence of silver streaking, foaming and burning is lessened and which is suitable for use in optical fields.

The present inventors have made diligent studies and found that a copolycarbonate excellent in thermal stability can be obtained by reducing cyclic acetal-based diol terminals of a copolycarbonate obtained by copolymerization to a very small content and causing phenolic hydroxyl groups to be present in a proper amount.

That is, according to the present invention, the object of this invention is achieved by the following.

1. A copolycarbonate containing 10-90 mol % of a unit (A) represented by the following formula (A) and 90-10 mol % of a unit (B) represented by the following formula (B) and having terminals satisfying the following expressions (i) and (ii),

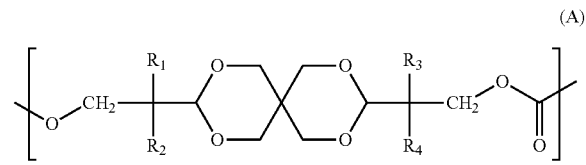

(A)

wherein each of $R_1$ to $R_4$ is independently a hydrogen atom or an alkyl group having 1 to 10 carbon atoms,

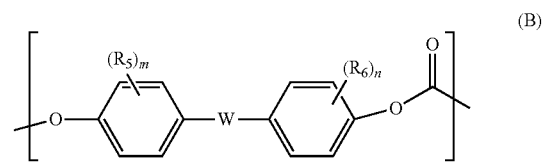

(B)

wherein each of $R_5$ and $R_6$ is independently a halogen atom or a hydrocarbon group having 1 to 10 carbon atoms, the hydrocarbon group may contain an aromatic group, each of m and n is independently an integer of 0 to 4, and W is a group selected from the following formulae,

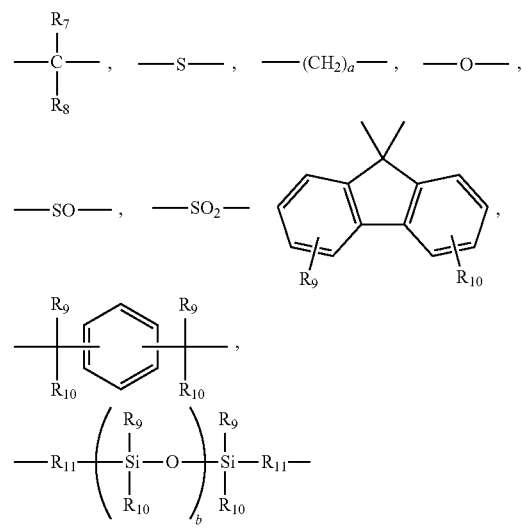

wherein each of $R_7$ and $R_8$ is independently a hydrogen atom, a fluorine atom, a chlorine atom, a bromine atom, an iodine atom, an alkyl group having 1 to 9 carbon atoms, an alkoxy group having 1 to 5 carbon atoms, an aryl group having 6 to 12 carbon atoms, an alkenyl group having 2 to 5 carbon atoms, or an aralkyl group having 7 to 17 carbon atoms, $R_7$ and $R_8$ may be bonded to each other and form a carbon ring or heterocyclic ring, each of $R_9$ and $R_{10}$ is independently a hydrogen atom, a fluorine atom, a chlorine atom, a bromine atom, an iodine atom, an alkyl group having 1 to 9 carbon atoms, an alkoxy group having 1 to 5 carbon atoms or an aryl group having 6 to 12 carbon atoms, $R_{11}$ is an alkylene group having 1 to 9 carbon atoms, a is an integer of 0 to 20, and b is an integer of 1 to 500, $0.0001 < (a)/(d) < 0.1$ (i)

$0.02 < (b)/(d) < 0.8$ (ii)

wherein (a) is an amount of terminal group represented by the following formula,

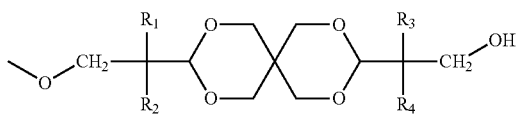

in which $R_1$ to $R_4$ are as defined in the unit (A),
(b) is an amount of terminal group represented by the following formula,

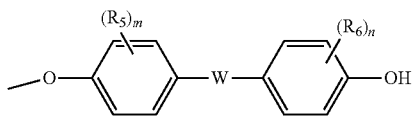

in which $R_5$, $R_6$, m, n and W are as defined in the unit (B),
(d) is a total terminal group amount and a total amount of (a), (b) and (c), and
a formula (c) is a terminal group represented by the following formula,

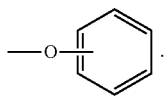

2. The copolycarbonate as recited in the above paragraph 1, wherein the terminals satisfy the following expressions (i) and (ii-1), $$0.0001 < (a)/(d) < 0.1 \quad \text{(i)}$$

$$0.02 < (b)/(d) < 0.5 \quad \text{(ii-1)}$$

wherein (a), (b) and (d) are as defined in the expressions (i) and (ii).
3. The copolycarbonate as recited in the above paragraph 1, wherein the terminals satisfy the following expression (iii), $$5 < (b)/(a) < 1000 \quad \text{(iii)}$$

wherein (a) and (b) are as defined in the expressions (i) and (ii).
4. The copolycarbonate as recited in the above paragraph 1, wherein the unit (A) is a unit (A1) represented by the following formula.

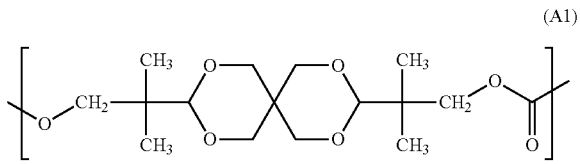

BEST MODE FOR CARRYING OUT THE INVENTION

This invention will be explained in detail hereinafter.
<Copolycarbonate>
The copolycarbonate of this invention comprises a unit (A) derived from cyclic acetal-based diols and a unit (B) derived from aromatic diols and has specific terminal structures.

(Unit (A))
The unit (A) has the following structure.

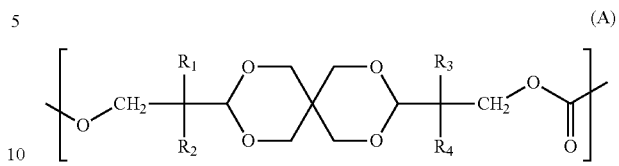

In the formula, each of $R_1$ to $R_4$ is independently a hydrogen atom or an alkyl group having 1 to 10 carbon atoms. The alkyl group having 1 to 10 carbon atoms includes methyl, ethyl, propyl, butyl, pentyl, hexyl, heptyl and octyl.
The unit (A) is preferably a unit (A1) represented by the following formula.

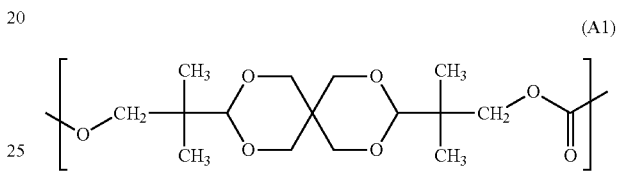

The unit (A) is derived from cyclic acetal-based diols. Examples of the cyclic acetal-based diols include 3,9-bis(1,1-dimethyl-2-hydroxyethyl)-2,4,8,10-tetraoxaspiro[5.5]undecane, 3,9-bis(1,1-diethyl-2-hydroxyethyl)-2,4,8,10-tetraoxaspiro[5.5]undecane, 3,9-bis(1,1-dipropyl-2-hydroxyethyl)-2,4,8,10-tetraoxaspiro[5.5]undecane. Of these, 3,9-bis(1,1-dimethyl-2-hydroxyethyl)-2,4,8,10-tetraoxaspiro[5.5]undecane (to be abbreviated as "spiroglycol" hereinafter) is preferred from a view point of a low photoelastic constant.

In this invention, the content of a methanesulfonate ion in the cyclic acetal diol used as a raw material monomer is preferably 1.5 ppm or less. It is more preferably 8 ppm or less, particularly preferably 3 ppm or less. When the content of the methanesulfonate ion is 15 ppm or less, advantageously, the cyclic acetal skeleton portion is less susceptible to hydrolysis under heat during polymerization, a trihydric or tetrahydric hydroxyl group is not easily formed, a crosslinking reaction hence does not easily take place during polymerization, so that the occurrence of gel is suppressed.

The method for obtaining the above cyclic acetal diol having not more than the upper limit content of methanesulfonate ion is not specially limited. Purification methods such as washing, distillation, re-crystallization, etc., are repeated a plurality of times as required, and these are combined, whereby the above product can be obtained. Of these, a method of filtering a re-crystallization product obtained by dissolving cyclic acetal diol in a solvent under heat and then cooling it, and washing a filtered product with ion-exchanged water is effective.

As a solvent for use in the above re-crystallization, a solvent in which cyclic acetal diol has fully high solubility at a high temperature and has fully low solubility around room temperature is preferred, and a solvent with which a coloring component of a resin is removable by the re-crystallization procedure is more preferred. Examples of the solvent having the above properties include alcohols, ethers, esters, ketones and aromatic hydrocarbons. Of these, alcohols are preferred, and in particular, alcohols having 1 to 10 carbon atoms are preferred. The above solvents may be used as a mixture of two or more members of them.

The re-crystallization can be carried out by a known method, and it may be carried out twice or more depending upon purities, etc., of raw materials for the above cyclic acetal diol. A crystal obtained by the re-crystallization is filtered and washed. Examples of a solvent for the washing include ion-exchanged water, alcohols, esters, ketones and aromatic hydrocarbons. Of these, ion-exchanged water is preferred since it can more effectively remove anions including methanesulfonate ion. Then, a re-crystallization product is dried by a proper method, and used as a raw material for melt-polymerization.

When the re-crystallization step includes the step of bringing cyclic acetal-based diols into contact with an adsorbent, ionic impurities can be further reduced. That is, the cyclic acetal-based diols are dissolved in a solvent, and then brought into contact with an adsorbent. The method therefor can be suitably carried out by any one of a batch method in which an adsorbent is added to a solution, followed by stirring, and a flow method in which a solution is caused to flow through an adsorbent layer filled in a column.

The adsorbent can be suitably selected from activated carbon, alumina, silica and zeolite, while activated carbon is particularly preferred. After the adsorbent is completely removed from the solution treated with the adsorbent by a method of filtering, etc., the above-described general re-crystallization is carried out to give a crystal of cyclic acetal-based diols.

Further, water-soluble ionic impurities, in particular methanesulfonate ion, can be reduced by incorporating the step of washing with water. That is, there is a method of bringing cyclic acetal dial into contact with ion-exchanged water and carrying out dehydration with a centrifugal separator. The washing with water can be carried out by a known method. By carrying out the washing with water or hot water twice or more depending upon a purity, etc., of the cyclic acetal diol, ionic impurities such as methanesulfonate ion can be further reduced.

(Unit (B))

The unit (B) has the following structure.

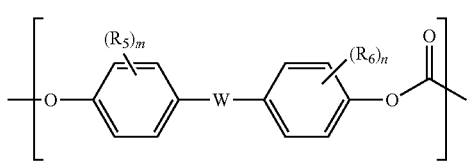

In the formula, each of $R_5$ and $R_6$ is independently a halogen atom or a hydrocarbon group having 1 to 10 carbon atoms, and the hydrocarbon group may contain an aromatic group.

The halogen atom includes a chlorine atom, a bromine atom, etc. The hydrocarbon group having 1 to 10 carbon atoms includes an alkyl group having 1 to 10 carbon atoms, a cycloalkyl group having 5 to 10 carbon atoms, an aryl group having 6 to 10 carbon atoms, an aralkyl group having 7 to 10 carbon atoms and an alkenyl group having 2 to 10 carbon atoms.

The alkyl group having 1 to 10 carbon atoms includes methyl, ethyl, propyl, butyl, pentyl, hexyl, heptyl, octyl, etc. The cycloalkyl group having 5 to 10 carbon atoms includes cyclopentyl, cyclohexyl, cycloheptyl, cyclooctyl, etc. The aryl group having 6 to 10 carbon atoms includes phenyl and naphthyl. The aralkyl group having 7 to 10 carbon atoms includes benzyl, etc. The alkenyl group having 2 to 10 carbon atoms includes ethenyl, propenyl, butenyl, pentenyl, hexenyl, heptenyl, etc.

The aromatic group substituted on the hydrocarbon group includes phenyl, benzyl and naphthyl.

Each of m and n is independently an integer of 0 to 4.

W is selected from the following formulae.

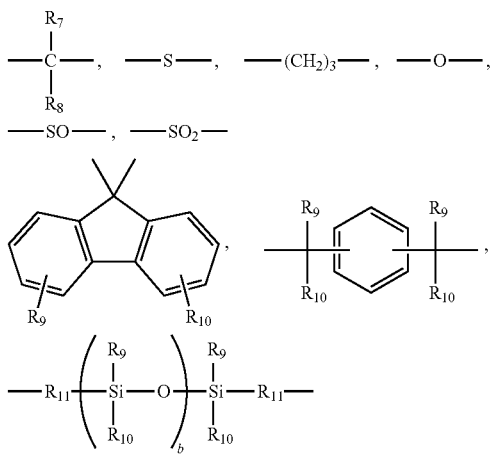

Each of $R_7$ and $R_8$ is independently a hydrogen atom, a fluorine atom, a chlorine atom, a bromine atom, an iodine atom, an alkyl group having 1 to 9 carbon atoms, an alkoxy group having 1 to 5 carbon atoms, an aryl group having 6 to 12 carbon atoms, an alkenyl group having 2 to 5 carbon atoms or an aralkyl group having 7 to 17 carbon atoms. Further, $R_7$ and $R_8$ may be bonded to each other and form a carbon ring or a heterocyclic ring. The alkyl group having 1 to 9 carbon atoms includes methyl, ethyl, propyl, butyl, pentyl, hexyl, heptyl, octyl, etc. The alkoxy group having 1 to 5 carbon atoms includes methoxy, ethoxy, propoxy, butoxy, pentyloxy, hexyloxy, heptyloxy, etc. The aryl group having 6 to 12 carbon atoms includes phenyl, naphthyl, etc. The alkenyl group having 2 to 5 carbon atoms includes ethenyl, propenyl, butenyl, pentenyl, hexenyl, heptenyl, etc. The aralkyl group having 7 to 17 carbon atoms includes benzyl, etc.

Each of $R_9$ and $R_{10}$ is independently a hydrogen atom, a fluorine atom, a chlorine atom, a bromine atom, an iodine atom, an alkyl group having 1 to 9 carbon atoms, an alkoxy group having 1 to 5 carbon atoms or an aryl group having 6 to 12 carbon atoms. The alkyl group having 1 to 9 carbon atoms includes methyl, ethyl, propyl, butyl, pentyl, hexyl, heptyl, octyl, etc. The alkoxy group having 1 to 5 carbon atoms includes methoxy, ethoxy, propoxy, butoxy, pentyloxy, hexyloxy, heptyloxy, etc. The aryl group having 6 to 12 carbon atoms includes phenyl, naphthyl, etc.

$R_{11}$ is an alkylene group having 1 to 9 carbon atoms. a is an integer of 0 to 20. b is an integer of 1 to 500. The alkylene group having 1 to 9 carbon atoms includes methylene, ethylene, propylene, trimethylene, butylene, tetramethylene, pentylene, hexylene, etc.

The unit (B) is derived from aromatic diols. It is required to use aromatic diols from the viewpoint of heat resistance and wavelength dispersibility.

Examples of the aromatic diols include 1,1-bis(4-hydroxyphenyl)ethane (bisphenol E), 2,2-bis(4-hydroxyphenyl)propane (bisphenol A), 2,2-bis(4-hydroxy-3-methylphenyl)propane (bisphenol C), 2,2-bis(4-hydroxyphenyl)butane, 1,1-bis(4-hydroxyphenyl)-1-phenylethane, 1,1-bis(4- hydroxyphenyl)cyclohexane (bisphenol Z), 1,1-bis(4-hydroxyphenyl)-3,3,5-trimethylcyclohexane, 2,2-bis(4-hydroxyphenyl)pentane, α,α'-bis(4-hydroxyphenyl)-p-diisopropylbenzene, α,α'-bis(4-hydroxyphenyl)-m-diisopropylbenzene (bisphenol M), 1,1-bis(4-hydroxyphenyl)-4-isopropylcyclohezane, 9,9-bis(4-hydroxyphenyl)fluorene, 9,9-bis(4-hydroxy-3-methylphenyl)fluorene, 9,9-bis(4-hydroxy-3-ethylphenyl)fluorene, 9,9-bis(4-hydroxy-3-n-propylphenyl)fluorene, 9,9-bis(4-hydroxy-3-isopropylphenyl)fluorene, 9,9-bis(4-hydroxy-3-n-butylphenyl)fluorene, 9,9-bis(4-hydroxy-3-sec-butylphenyl)fluorene, 9,9-bis(4-hydroxy-3-tert-butylphenyl)fluorene, 9,9-bis(4-hydroxy-3-cyclohexylphenyl)fluorene, and 9,9-bis(4-hydroxy-3-phenylphenyl)fluorene. Out of these, bisphenol A, 9,9-bis(4-hydroxy-3-methylphenyl)fluorene, bisphenol Z, bisphenol C, bisphenol E, bisphenol M and 9,9-bis[4-(2-hydroxyethoxy)phenyl]fluorine are preferred. In particular, bisphenol A and 9,9-bis(4-hydroxy-3-methylphenyl)fluorene are preferred from the viewpoint of heat resistance and wavelength dispersibility. The above diols described as examples may be used in combination of two or more.

(Compositional Ratio)

In the copolycarbonate of this invention, the content of the unit (A) is 10 to 90 mol %, preferably 20 to 80 mol %, more preferably 30 to 70 mol %. The content of the unit (B) is 90 to 10 mol %, preferably 80 to 20 mol %, more preferably 70 to 30 mol %. When the content of the unit (A) is within the lower limit or more, a copolycarbonate obtained has a low photoelastic constant, and, unevenness by heat does not easily take place advantageously when it is used as a film. When the content of the unit (A) is within the upper limit or less, a film formed does not easily undergo crystallization advantageously. Mol % is calculated by measurement with JNM-AL400 proton NMR supplied by JEOL Ltd.

(Terminal Groups)

The copolycarbonate of this invention has a hydroxyl group derived from a cyclic acetal-based diol, phenolic hydroxyl group and phenyl group.

(a) is an amount (mol) of a hydroxy group derived from a cyclic acetal-based diol represented by the following formula.

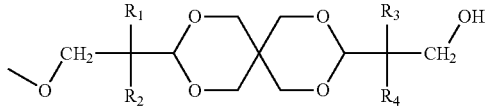

($R_1$ to $R_4$ are as defined in the unit (A)).

(b) is an amount (mol) of a phenolic hydroxyl group represented by the following formula.

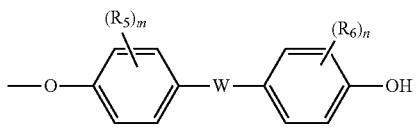

($R_5$, $R_6$, m, n and W are as defined in the unit (B)).

(c) is an amount (mol) of a phenyl group represented by the following formula.

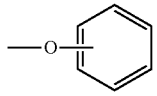

The copolycarbonate of this invention satisfies the following expression (i). In the expression, (d) is a total terminal group amount (mol), and a total amount of (a), (b) and (c).

$$0.0001 < (a)/(d) < 0.1 \quad (i)$$

In the copolycarbonate of this invention, (a)/(d) preferably satisfies the following expression (i-1), more preferably, the following expression (i-2).

$$0.001 < (a)/(d) < 0.05 \quad (i-1)$$

$$0.001 < (a)/(d) < 0.03 \quad (i-2)$$

In the copolycarbonate of this invention, when (a)/(d) is 0.0001 or less, (b)/(d) comes to be 0.8 or more, a silver streaking takes place. On the other hand, when it is 0.1 or more, there is a problem concerning residence stability, and the deterioration of a color hue and a silver streaking take place.

The copolycarbonate of this invention satisfies the following expression (ii).

$$0.02 < (b)/(d) < 0.8 \quad (ii)$$

In the copolycarbonate of this invention, (b)/(d) preferably satisfies the following expression (ii-1), more preferably, the following expression (ii-2), still more preferably, the following expression (ii-3).

$$0.02 < (b)/(d) < 0.5 \quad (ii-1)$$

$$0.04 < (b)/(d) < 0.45 \quad (ii-2)$$

$$0.08 < (b)/(d) < 0.4 \quad (ii-3)$$

In the copolycarbonate of this invention, when (b)/(d) is 0.02 or less, the polymerization speed is so greatly decreased that an intended molecular weight is sometimes not reached, or a polymerization takes a longer time to cause a thermal history and a change in color hue. On the other hand, when it is 0.8 or more, there is a problem concerning residence stability, and the deterioration of a color hue and a silver streaking take place.

The copolycarbonate of this invention preferably satisfies the following expression (iii).

$$5 < (b)/(a) < 1000 \quad (iii)$$

wherein (a) and (b) are as defined in the expressions (i) and (ii).

In the copolycarbonate of this invention, (b)/(c) preferably satisfies the following expression (iii-1), more preferably, the expression (iii-2).

$$10 < (b)/(a) < 500 \quad (iii-1)$$

$$20 < (b)/(a) < 100 \quad (iii-2)$$

In the copolycarbonate of this invention, when (b)/(a) is outside the above range, residence stability is liable to be impaired, and the deterioration of a color hue and a silver streaking are liable to take place.

The copolycarbonate of this invention preferably satisfies the following expression (iv).

$$0.02 < \{(d)-(c)\}/(d) < 0.5 \quad (iv)$$

wherein (d) and (c) are as defined in the expressions (i) and (ii).

In the copolycarbonate of this invention, $\{(d)-(c)\}/(d)$ preferably satisfies the following expression (iv-1), more preferably, the following expression (iv-2)

$$0.05 < \{(d)-(c)\}/(d) < 0.4 \quad (iv-1)$$

$$0.07 < \{(d)-(c)\}/(d) < 0.4 \quad (iv-2)$$

When $\{(d)-(c)\}/(d)$ is outside the above range, residence stability is liable to be impaired, and the deterioration of a color hue and a silver streaking are liable to take place. That is, according to this invention, while the content of hydroxyl group of the cyclic acetal-based diols is decreased, a proper amount of phenolic terminal group is present, a copolycarbonate having excellent thermal stability can be formed and in good polymerizability.

In the above copolycarbonate of this invention, the OH terminal group amount, etc., can be adjusted, for example, by the following method. A charging ratio of hydroxy group to carbonate ester is adjusted such that the carbonate ester becomes slightly larger, whereby the OH terminal group amount can be decreased. Further, controlling a temperature and pressure in the polymerization step is effective. For example, when the polymerization step is separated into the first step to the third step, controlling the pressure reduction degree and temperature as follows is effective for reducing the OH terminal group amount.

In this invention, the OH terminal group amount of the copolycarbonate is measured by a proton NMR method. For example, by proton NMR, hydroxy groups (2-4 ppm) of the cyclic acetal-based diols, phenyl carbonate groups (7.0-7.30 ppm) of the cyclic acetal-based diols, phenolic hydroxy groups (6.3-6.9 ppm) and phenolic phenyl carbonate groups (7.0-7.4 ppm) can be measured.

(Method for Producing Copolycarbonate)

A production method by melt-polymerization to achieve the above OH terminal group amount will be explained below.

First, it is important to increase the molar ratio of a carbonate ester such as carbonic diester to a charged diol component and to control the temperature and pressure as described already. Needless to say, it is sufficient to keep the above relationship of hydroxyl group amounts, and this invention shall not be limited to the following production method. To begin with, a carbonate precursor such as carbonic acid diester is allowed to react with the diol component charged to satisfy the above molar ratio, to carry out melt-polymerization.

The carbonic acid diester used for an ester exchange reaction includes esters of an optionally substituted aryl group having 6 to 12 carbon atoms, aralkyl group, etc. Specifically, it includes diphenyl carbonate, ditolyl carbonate, bis(chlorophenyl)carbonate, etc. Of these, diphenyl carbonate is particularly preferred. The amount of the diphenyl carbonate for use per mole of a total diol amount is preferably 0.97 to 1.10 mol, more preferably, 1.00 to 1.06 mol. When it is controlled in the above range, it brings less foaming, advantageously. When the amount of the diphenyl carbonate for use per mole of a total diol amount comes to be smaller than 0.97 mol, the diphenyl carbonate comes to be less than a theoretical amount due to its volatilization when it is controlled at a temperature under a pressure during the following production. Therefore, the reaction does not proceed, and a desired molecular weight cannot be obtained, so that residence stability is deteriorated, which causes a color hue to be deteriorated and a silver streaking.

Further, when the amount of the diphenyl carbonate for use per mole of a total diol amount is larger than 1.10 mol the amount of phenol increases due to decomposition of diphenyl carbonate, the amount of residual phenol becomes larger at a final stage in the third step, which undesirably causes the deteriorated color hue of a resin.

The polymerization step is separated into the following first step, second step and third step, and each step will be explained below.

The first step is a step in which the final vacuum degree is in the range of 10 kPa or less but 8 kPa or more, the final resin temperature is in the range of 160° C. or more but 235° C. or less, and ester-exchange is carried out until the molar amount of residual cyclic acetal-based diols comes to be 1 mol. % or more but 30 mol % or less based on the total molar amount of charged diols. The final vacuum degree is preferably in the range of 30 kPa or less but 9 kPa or more, more preferably in the range of 20 kPa or less but 10 kPa or more. Further, the pressure reduction speed is preferably 20 kPa/minute or less but 0.5 kPa/minute or more. The final resin temperature is more preferably in the range of 160° C. to 200° C. When it is 160° C. or more, the reaction easily proceeds, and productivity is good. Further, when it is 235° C. or less, cyclic acetal-based diols are less susceptible to decomposition, and gel is not easily generated. Ester-exchange is preferably carried out such that the molar amount of residual cyclic acetal-based diols comes to be 1 mol % or more but 20 mol % or less based on the molar amount of the total diols. When the second step follows the first step wherein the molar amount of the residual cyclic acetal-based diols exceeds the upper limit, it is assumed that the cyclic acetal-based diols undergo decomposition to constitute a source of gel. Further, foaming by a decomposition product easily takes place when a film is formed by melting.

When it is less than the lower limit, the polymerization degree proceeds too much and a melt viscosity becomes high abruptly, and a problem that the yield is decreased or that outputting is impossible is liable to take place. Further, an aromatic diol reacts preferentially, an unreacted cyclic acetal-based diol component is liable to remain, and foaming by a decomposition product easily takes place when a film is formed by melting. The ester-exchange reaction by using carbonic acid diester as a carbonate precursor is carried out by a method in which a predetermined amount ratio of a diol component is stirred together with the carbonic acid diester under heat in an inert gas atmosphere, and formed alcohol or phenols are distilled off. The reaction is proceeded while formed alcohol or phenols are distilled off under reduced pressure from an initial stage of the reaction so as to complete the reaction. Concerning the temperature, preferably, heating is started at room temperature then gradually increased but the temperature does not exceed the final temperature during the heating.

The second step is a step in which the final vacuum degree is in the range of less than 8 kPa but 1 kPa or more, the final resin temperature is in the range of 220° C. or more but 240° C. or less, and ester-exchange is carried out such that a copolycarbonate has a specific viscosity of 0.03 or more but 0.2 or less. In the second step, the copolycarbonate polymerized in the first step is farther polymerized. The final vacuum degree is preferably in the range of 6 kPa or less but 1.5 kPa or more, more preferably in the range of 3 kPa or less but 2 kPa or more. The pressure reduction speed is preferably 5 kPa/minute or less but 0.1 kPa/minute or more. The final resin temperature is preferably in the range of 220° C. or more but 230° C. or less. The ester-exchange is more preferably carried out such that a copolycarbonate has a specific viscosity of 0.05 or more but 0.2 or less. Concerning the temperature, preferably, gradual heating is started at the temperature of the first step, and the temperature does not exceed the final temperature during the heating. When the final polymerization temperature is 240° C. or lower, a remaining cyclic acetal-based diol is less susceptible to decomposition, and gel is not easily generated. Further, since the reactivity of an aromatic diol and that of the cyclic acetal-based diol are close to each other, a remaining cyclic acetal-based diol can be reduced. Further, when it is 220° C. or higher, the reaction easily proceeds, and the cyclic acetal-based diols do not easily undergo decomposition due to a thermal history, so that gel is not easily generated. When the final vacuum degree is less than 8 kPa, phenol is easily distilled off, and the reaction easily proceeds, so that the cyclic acetal-based diols do not easily undergo decomposition due to a thermal history, and that gel is not easily generated. Further, a remaining cyclic acetal-based diol can be reduced. When the final vacuum degree is 1 kPa or more, carbonic acid diester is not easily distilled off as a phenol is distilled off, so that a molar amount balance is not easily disrupted, which easily leads to the growth of a molecular weight.

The third step is a step in which the final vacuum degree is less than 1 kPa, the final resin temperature is in the range of 235° C. or more but 270° C. or less, and ester-exchange is carried out such that a copolycarbonate has a specific viscosity of 0.2 or more but 0.6 or less. In the third step, the copolycarbonate polymerized in the second step is further polymerized. When the final vacuum degree is less than 1 kPa, formed alcohol or phenols and diols do not easily remain in the system, and the color hue of a resin and the decomposition reaction are suppressed, which are desirable. The final vacuum degree is more preferably 0.5 kPa or less. When the final resin temperature is 235° C. or higher, the melt-viscosity becomes not too high, the yield will not be decreased or outputting will easily take place. When it is 270° C. or lower, it is assumed that an oligomer of remaining cyclic acetal-based diols is not easily decomposed, and that gel is not easily generated. The final resin temperature is preferably in the range of 240° C. or higher but 260° C. or less. Ester-exchange is preferably carried out such that a copolycarbonate has a specific viscosity of 0.25 or more but 1.5 or less. Concerning the temperature, preferably, gradual heating is started at the temperature of the first step, and the temperature does not exceed the final temperature during the heating.

Further, other conditions in the above production method will be further described in detail below.

First, in the melt-polymerization method, a polymerization catalyst can be used for accelerating the polymerization speed. The above polymerization catalyst includes an alkali metal compound, an alkaline earth metal compound, a nitrogen-containing compound and a metal compound all of which are known per se.

The above compound can be preferably selected from organic acid salts, inorganic acid salts, oxides, hydroxides, hydrides, alkoxides, quaternary ammonium hydroxides, etc., of an alkali metal or an alkaline earth metal. These can be used singly or in combination.

Specific alkali metal compounds include sodium hydroxide, potassium hydroxide, cesium hydroxide, lithium hydroxide, sodium hydrogencarbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium benzoate, potassium benzoate, cesium benzoate, lithium benzoate, disodium hydrogenphosphate, dipotassium hydrogenphosphate, dilithium hydrogenphosphate, disodium phenylphosphate, disodium salt, dipotassium salt, dicesium salt and dilithium salt of bisphenol A, and sodium salt, potassium salt, cesium salt and lithium salt of phenol.

Specific alkaline earth metal compounds include magnesium hydroxide, calcium hydroxide, strontium hydroxide, barium hydroxide, magnesium carbonate, calcium carbonate, strontium carbonate, barium carbonate, magnesium diacetate, calcium diacetate, strontium diacetate and barium diacetate.

Specific nitrogen-containing compounds include quaternary ammonium hydroxides having an alkyl or aryl group such as tetramethylammonium hydroxide, tetraethylammonium hydroxide, tetrapropylammonium hydroxide, tetrabutylammonium hydroxide and trimethylbenzylammonium hydroxide. They also include tertiary amines such as triethylamine, dimethylbenzylamine and triphenylamine and imidazoles such as 2-methylimidazole, 2-phenylimidazole and benzoimidazole. Further, they include bases or basic salts such as ammonia, tetramethylammonium borohydride, tetrabutylammonium borohydride, tetrabutylammonium tetraphenylborate, and tetrabutylammonium tetraphenylborate.

Specific other metal compounds include a zinc aluminum compound, a germanium compound, an organotin compound, an antimony compound, a manganese compound, a titanium compound and a zirconium compound. These compounds may be used singly or in combination.

The amount of the above polymerization catalyst for use per mole of the diol component is preferably selected in the range of $1 \times 10^{-9}$ to $1 \times 10^{-2}$ equivalent weight, more preferably, $1 \times 10^{-8}$ to $1 \times 10^{-2}$ equivalent weight, still more preferably, $1 \times 10^{-7}$ to $1 \times 10^{-3}$ equivalent weight.

At a late stage of the reaction, a catalyst deactivator may be added. The catalyst deactivator to be used can be effectively selected from known catalyst deactivators, and of these, ammonium salt and phosphonium salt of sulfonic acid are preferred. Further, salts of dodecylbenzenesulfonic acid such as dodecylbenzenesulfonic acid tetrabutylphosphonium salt and salts of p-toluenesulfonic acid such as p-toluenesulfonic acid tetrabutylammonium salt are preferred.

As a sulfonic acid ester, further, methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate and phenyl p-toluenesulfonate are also preferably used.

Of these, dodecylbenzenesulfonic acid tetrabutylphosphonium salt is most preferably used. When at least one polymerization catalyst selected from the alkali metal compounds and/or alkaline earth metal compounds is used, the amount of the catalyst deactivator that can be used per mole of the metal compound of the catalyst is preferably 0.5 to 50 mol, more preferably 0.5 to 10 mol, still more preferably 0.8 to 5 mol. The copolycarbonate of this invention may be used in combination with other resin so long as the effect of this invention is not impaired.

Further, additives such as a thermal stabilizer, a plasticizer, a light stabilizer, a heavy metal deactivator, a flame retardant, a lubricant, an antistatic agent, a surfactant, an anti-fungus agent, an ultraviolet absorbent and a mold release agent can be incorporated as required depending upon use and necessity.

(Specific Viscosity: $\eta_{SP}$)

The specific viscosity ($\eta_{SP}$) of copolycarbonate of this invention is preferably in the range of 0.20 to 1.50, more preferably in the range of 0.23 to 1.20, particularly preferably in the range of 0.25 to 1.00, since such a copolycarbonate can be imparted with both strength and moldability.

When the specific viscosity ($\eta_{SP}$) of a copolycarbonate obtained in the third step in this invention comes to be smaller than 0.2, undesirably, no desired strength can be obtained. Further, when the specific viscosity ($\eta_{SP}$) of a copolycarbonate obtained in the third step in this invention comes to be greater than 1.50, undesirably, moldability is deteriorated.

The specific viscosity in this invention is determined from a solution of 0.7 g of a copolycarbonate in 100 ml of methylene chloride at 20° C. with an Ostwald viscometer.

$$\text{Specific viscosity } (\eta_{SP})=(t-t_0)/t_0$$

[$t_0$ is the number of seconds that methylene chloride takes to fall, and t is the number of seconds that a sample solution takes to fall.]

When a copolycarbonate is measured for a specific viscosity, the measurement can be made in the following manner. That is, a copolycarbonate is dissolved in a methylene chloride having an amount 20 to 30 times the weight of the copolycarbonate, a soluble component is collected by cerite filtering, then, the solvent is removed, and the remainder is fully dried to give a solid soluble in methylene chloride. A specific viscosity at 20° C. is determined from a solution of 0.7 g of such a solid in 100 ml of methylene chloride with Ostwald viscometer.

(Photoelastic Constant)

The absolute value of photoelastic constant of the copolycarbonate of this invention is preferably $40\times10^{-12}$ $Pa^{-1}$ or less, more preferably $35\times10^{-12}$ $Pa^{-1}$ or less, still more preferably $30\times10^{-12}$ $Pa^{-1}$ or less. When the absolute value exceeds $40\times10^{-12}$ $Pa^{-1}$, the birefringence caused by a residual stress during molding is liable to become large. The photoelastic constant is determined by measuring an unstretched film with a spectroellipsometer M-220 supplied by JASCO Corporation.

<Optical Molded Product>

The optical molded product formed from the copolycarbonate of this invention is produced, for example, by any method such as an injection molding method, a compression molding method, an extrusion molding method or a solution casting method. Since the copolycarbonate of this invention has a low photoelastic constant and can materialize desired wavelength dispersibility by being stretched, it can be advantageously used in particular as an optical film. Naturally, the copolycarbonate of this invention has a low photoelastic constant and also has excellent moldability, so that it can be advantageously used as molded articles for optical use suitable for use in the fields of structural materials or functional materials for optical parts such as an optical disc substrate, an optical lens, a liquid crystal panel, an optical card, a sheet, a film, an optical fiber, a connector, a vapor-deposition plastic reflector and a display.

<Optical Film>

The optical film formed from the copolycarbonate of this invention can be specifically applied to the fields of a retardation film, a plastic cell substrate film, a polarizing plate protective film, an anti-reflection film, a brightness increasing film, a protective film for an optical disk and a diffusion film, and of these, it can be suitably applied to a retardation film, a polarizing plate protective film and an anti-reflection film.

The method for producing an optical film includes, for example, known methods such as a solution casting method, a melt-extrusion method, a hot press method and a calendering method. Of these, a solution casting method and a melt-extrusion method are preferred, and from the viewpoint of productivity, a melt-extrusion method is particularly preferred.

In the melt-extrusion method, it is preferred to use a method in which a resin is extruded through a T-die and an extrudate is sent to a cooling roll. In this case, the temperature is determined depending upon the molecular weight, Tg and melt-flowing characteristics of a copolycarbonate, while it is in the range of 180 to 350° C., more preferably in the range of 200° C. to 320° C. When it is lower than 180° C., undesirably, the viscosity becomes high, and the orientation and stress-strain of the polymer are liable to remain. Further, when it is higher than 350° C., problems of thermal deterioration, coloring and die lines (streaks) from a T-die are liable to be caused.

The copolycarbonate of this invention has excellent solubility in an organic solvent, so that a solution casting method can be also applied thereto. In the solution casting method, the solvent can be suitably selected from methylene chloride, 1,2-dichloroethane, 1,1,2,2-tetrachloroethane, dioxolane and dioxane. The amount of a residual solvent in a film-like product obtained by the solution casting method is preferably 2% by weight or less, more preferably 1 part by weight or less. When it exceeds 2% by weight or the residual solvent is large in amount, the glass transition temperature of a film-like product is greatly decreased, and it is undesirable from the viewpoint of heat resistance.

The thickness of an unstretched film formed from the polycarbonate of this invention is preferably in the range of 30 to 400 μm, more preferably in the range of 40 to 300 μm. When such a film-like product is further stretched to obtain a retardation film, it is sufficient to determine the thickness thereof in the above range as required by taking account of a desired retardation value and thickness of an optical film.

EXAMPLES

This invention will be explained in detail with reference to Examples hereinafter, while this invention shall not be limited thereto. In Examples, "part" stands for "part by weight". Resins and evaluation methods used in Examples are as follows.

1. Measurement of Specific Viscosity

A specific viscosity was determined on the basis of the following equation from a solution of 0.7 g of a copolycarbonate in 100 ml of methylene chloride at 20° C. with an Ostwald viscometer.

$$\text{Specific viscosity } (\eta_{SP})=(t-t_0)/t_0$$

[$t_0$ is the number of seconds that methylene chloride takes to fall, and t is the number of seconds that a sample solution takes to fall.]

2. Terminal Group Amount

An amount of each terminal group is determined by proton NMR of JNM-AL400 supplied by JEOL Ltd. When a copolycarbonate formed from spiroglycol, 9,9-bis(4-hydroxy-3-methylphenyl)fluorene and diphenyl carbonate is taken an example, the hydroxyl group of spiroglycol appears in the range of 2.5 to 2.6 ppm, the phenyl group of spiroglycol appears in the range of 7.15 to 7.20 ppm, the phenolic hydroxyl group appears in the range of 6.5 to 6.8 ppm, and the phenolic phenyl group appears in the range of 2.165 to 2.195 ppm. Hence, integration values of these were measured, the hydroxy group amount of each terminal was calculated from each integration value, and then the values of the following expressions were determined.

Hydroxy group amount of spiroglycol/total terminal group amount=$(a)/(d)$

Phenolic hydroxyl group amount/total terminal group amount=$(b)/(d)$

Phenolic hydroxy group amount/hydroxy group amount of spiroglycol=$(b)/(a)$

3. Measurement of Photoelastic Constant

An unstretched film was measured with a spectroellipsometer M-220 supplied by JASCO Corporation.

4. Evaluation of Residence Stability

Pellets were molded into plates having a thickness of 2 mm with an injection molding machine J-85-ELIII supplied by the Japan Steel Works, Ltd., at a cylinder temperature of 290° C., a mold temperature of 80° C. and at a one-minute cycle. Plates were continuously molded 20 times, then, the resin was caused to reside in the cylinder of the above injection molding machine for 10 minutes, and then the resided resin was molded into a plate having a thickness of 2 mm. A case where silver streaks occurred on the entire surface after 10 minutes' residence was taken as x, a case where they were partly observed was taken as Δ, and a case where no silver streaking occurred was taken as ○.

5. Evaluation of Foamed Cells of Film

A 50 μm thick film-like product was observed through a color 3-D laser microscope VK-9700 supplied by Keyence Corporation to count foamed cells having major axes with a diameter of 100 μm or more each in 500 mm×500 mm and convert the counted number as a number in 1 $m^2$ of the film-like product.

Example 1

Preparation of Copolycarbonate 86.97 Parts of SPG, 46.35 parts of 9,9-bis(4-hydroxy-3-methylphenyl)fluorene (to be abbreviated as "BCF" hereinafter), 89.29 parts of diphenyl carbonate and $5.2 \times 10^{-4}$ part of sodium hydrogencarbonate as a catalyst were melted by heating them to a resin temperature of 150° C. in nitrogen atmosphere. Then, the final vacuum degree was adjusted to 10 kPa over 10 minutes, and they were allowed to react by heating them to a resin temperature of 160° C. Then, the temperature was increased to a final resin temperature of 190° C. at a rate of 60° C./hour, and that temperature was maintained at a pressure reduction degree of 10 kPa for 10 minutes. Further, the temperature was increased to a final resin temperature of 225° C. at a rate of 30° C./hour, the final vacuum degree was adjusted to 2 kPa, the final resin temperature was adjusted to 260° C. at a rate of 30° C./hour, the final vacuum degree was adjusted to 133 Pa, and they were allowed to react for 220 minutes in total. After completion of the reaction, dodecylbenzenesulfonic acid tetrabutylphosphonium salt in an amount 1.5 times the catalyst amount was added to deactivate the catalyst, and then, a reaction product was outputted from the bottom of a reaction vessel under the elevated pressure of nitrogen and cut with a pelletizer with cooling it in a water tank to give pellets. The pellets were measured for a specific viscosity, and Table 1 shows the result. Further, the above pellets were evaluated for residence stability.

<Preparation of Film>

Then, a T-die having a width of 150 mm and a lip width of 500 μm and a film take-up apparatus were mounted to a 150 mmφ twin-screw extruder supplied by Technovel Corporation, and the obtained copolycarbonate was formed into a film at 270° C. to give a transparent extrusion film having a thickness of 50 μm. The film was measured for a photoelastic constant and the number of foamed cells. Table 1 shows the results.

Example 2

A copolycarbonate was obtained in the same manner as in Example 1 except that the amount of diphenyl carbonate was changed to 89.73 parts. Pellets of the copolycarbonate were measured for a specific viscosity, and Table 1 shows the result. The pellets were also evaluated for resistance stability. Then, a film was formed in the same manner as in Example 1, and it was measured for photoelastic constant and the number of foamed cells. Table 1 shows the results.

Example 3

A copolycarbonate was obtained in the same manner as in Example 1 except that the amount of SPG was changed to 86.97 parts, that the amount of BCF was changed to 72.09 parts and that the amount of diphenyl carbonate was changed to 104.18 parts. Pellets of the copolycarbonate were measured for a specific viscosity, and Table 1 shows the result. The pellets were also evaluated for resistance stability.

Then, a film was formed in the same manner as in Example 1, and it was measured for a photoelastic constant and the number of foamed cells. Table 1 shows the results.

Example 4

A copolycarbonate was obtained in the same manner as in Example 3 except that the amount of diphenyl carbonate was changed to 104.69 parts. Pellets of the copolycarbonate were measured for a specific viscosity, and Table 1 shows the result. The pellets were also evaluated for resistance stability.

Then, a film was formed in the same manner as in Example 1, and it was measured for a photoelastic constant and the number of foamed cells. Table 1 shows the results.

Comparative Example 1

Preparation of Copolycarbonate 86.97 Parts of SPG, 46.35 parts of BCF, 88.86 parts of diphenyl carbonate and $5.2 \times 10^{-4}$ part of sodium hydrogencarbonate as a catalyst were melted by heating them to a resin temperature of 150° C. in nitrogen atmosphere. Then, the final vacuum degree was adjusted to 10 kPa over 10 minutes, and they were allowed to react by heating them to a resin temperature of 160° C. Then, the temperature was increased to a final resin temperature of 190° C. at a rate of 60° C./hour, and the pressure reduction degree was adjusted to 6 kPa over 10 minutes. Further, the temperature was increased to a final resin temperature of 225° C. at a rate of 30° C./hour, the final vacuum degree was adjusted to 2 kPa, further, the final resin temperature was adjusted to 260° C. at a rate of 30° C./hour, the final vacuum degree was adjusted to 133 Pa, and they were allowed to react for 220 minutes in total. After completion of the reaction, dodecylbenzenesulfonic acid tetrabutylphosphonium salt in an amount 1.5 times the catalyst amount was added to deactivate the catalyst, and then, a reaction product was outputted from the bottom of a reaction vessel under the elevated pressure of nitrogen and cut with a pelletizer with cooling it in a water tank to give pellets. The pellets were measured for a specific viscosity, and Table 1 shows the result. Further, the above pellets were evaluated for residence stability.

<Preparation of Film>

A film was formed in the same manner as in Example 1, and the film was measured for a photoelastic constant and the number of foamed cells. Table 1 shows the results.

Comparative Example 2

A copolycarbonate was obtained in the same manner as in Comparative Example 1 except that the amount of SPG was changed to 86.97 parts, that the amount of BCF was changed to 72.09 parts and that the amount of diphenyl carbonate was changed to 104.18 parts. Pellets of the copolycarbonate were measured for a specific viscosity, and Table 2 shows the result. The pellets were also evaluated for residence stability.

Then, a film was formed in the same manner as in Example 1, and the film was measured for a photoelastic constant and the number of foamed cells. Table 1 shows the results.

Comparative Example 3

A copolycarbonate was obtained in the same manner as in Example 3 except that the amount of diphenyl carbonate was changed to 103.66 parts. Pellets of the copolycarbonate were measured for a specific viscosity, and Table 1 shows the result. The pellets were also evaluated for residence stability.

Then, a film was formed in the same manner as in Example 1, and the film was measured for a photoelastic constant and the number of foamed cells. Table 1 shows the results.

Comparative Example 4

86.97 Parts of SPG, 46.35 parts of BCF, 89.29 parts of diphenyl carbonate and $5.2 \times 10^{-4}$ part of sodium hydrogencarbonate as a catalyst were melted by heating them to a resin temperature of 150° C. in nitrogen atmosphere. Then, the final vacuum degree was adjusted to 10 kPa over 10 minutes, and they were allowed to react by heating them to a resin temperature of 160° C. Then, the temperature was increased to a final resin temperature of 190° C. at a rate of 60° C./hour, and the pressure reduction degree was adjusted to 2 kPa over 10 minutes. Further, the temperature was increased to a final resin temperature of 225° C. at a rate of 30° C./hour, the final, vacuum degree was adjusted to 1 kPa, further, the final resin temperature was adjusted to 260° C. at a rate of 30° C./hour, the final vacuum degree was adjusted to 133 Pa, and they were allowed to react for 220 minutes in total. After completion of the reaction, dodecylbenzenesulfonic acid tetrabutylphosphonium salt in an amount 1.5 times the catalyst amount was added to deactivate the catalyst, and then, a reaction product was outputted from the bottom of a reaction vessel under the elevated pressure of nitrogen and cut with a pelletizer with cooling it in a water tank to give pellets. The pellets were measured for a specific viscosity, and Table 1 shows the result. Further, the above pellets were also evaluated for residence stability.

A film was formed in the same manner as in Example 1, and the film was measured for a photoelastic constant and the number of foamed cells. Table 1 shows the results.

Example 5

86.97 Parts of SPG, 27.95 parts of bisphenol A, 89.29 parts of diphenyl carbonate and $5.2 \times 10^{-4}$ part of sodium hydrogencarbonate as a catalyst were melted by heating them to a resin temperature of 150° C. in nitrogen atmosphere. Then, the final vacuum degree was adjusted to 10 kPa over 10 minutes, and they were allowed to react by heating them to a resin temperature of 160° C. Then, the temperature was increased to a final resin temperature of 190° C. at a rate of 60° C./hour, and the pressure reduction degree was adjusted to 10 kPa over 10 minutes. Further, the temperature was increased to a final resin temperature of 225° C. at a rate of 30° C./hour, the final vacuum degree was adjusted to 1 kPa, the final resin temperature was adjusted to 260° C. at a rate of 30° C./hour, the final vacuum degree was adjusted to 133 Pa, and they were allowed to react for 220 minutes in total. After completion of the reaction, dodecylbenzenesulfonic acid tetrabutylphosphonium salt in an amount 1.5 times the catalyst amount was added to deactivate the catalyst, and then, a reaction product was outputted from the bottom of a reaction vessel under the elevated pressure of nitrogen and cut with a pelletizer with cooling it in a water tank to give pellets. The pellets were measured for a specific viscosity, and Table 2 shows the result. Further, the above pellets were evaluated for residence stability.

Then, a film was formed in the same manner as in Example 1, and the film was measured for a photoelastic constant and the number of foamed cells. Table 2 shows the results.

Example 6

86.97 Parts of SPG, 38.06 parts of 1,1-bis(4-hydroxyphenyl)3,3,5-trimethylsiloxane, 89.29 parts of diphenyl carbonate and $5.2 \times 10^{-4}$ part of sodium hydrogencarbonate as a catalyst were melted by heating them to a resin temperature of 150° C. in nitrogen atmosphere. Then, the final vacuum degree was adjusted to 10 kPa over 10 minutes, and they were allowed to react by heating them to a resin temperature of 160° C. Then, the temperature was increased to a final resin temperature of 190° C. at a rate of 60° C./hour, and the pressure reduction degree was adjusted to 10 kPa over 10 minutes. Further, the temperature was increased to a final resin temperature of 225° C. at a rate of 30° C./hour, the final vacuum degree was adjusted to 1 kPa, the final resin temperature was adjusted to 260° C. at a rate of 30° C./hour, the final vacuum degree was adjusted to 133 Pa, and they were allowed

TABLE 1

| | Constituent monomer (molar ratio) | | Specific viscosity | SPG hydroxyl group/ total terminal groups | Phenolic hydroxy group/ total terminal groups | Phenolic hydroxy group/ SPG hydroxyl groups | Photo- elastic constant $10^{-12}$Pa | Evaluation of residence stability | Number of foamed cells piece/m$^2$ |
|---|---|---|---|---|---|---|---|---|---|
| | SPG | BCF | | | | | | | |
| Ex. 1 | 70 | 30 | 0.349 | 0.007 | 0.38 | 54.3 | 14 | ○ | 0 |
| Ex. 2 | 70 | 30 | 0.341 | 0.002 | 0.09 | 45.0 | 14 | ○ | 0 |
| Ex. 3 | 60 | 40 | 0.338 | 0.009 | 0.39 | 43.3 | 17 | ○ | 0 |
| Ex. 4 | 60 | 40 | 0.332 | 0.003 | 0.11 | 36.7 | 17 | ○ | 0 |
| C. Ex. 1 | 70 | 30 | 0.351 | 0.13 | 0.58 | 4.5 | 14 | x | 684 |
| C. Ex. 2 | 60 | 40 | 0.34 | 0.11 | 0.56 | 5.1 | 17 | Δ | 136 |
| C. Ex. 3 | 60 | 40 | 0.355 | 0.19 | 0.75 | 3.9 | 17 | x | 750 |
| C. Ex. 4 | 70 | 30 | 0.338 | 0.12 | 0.48 | 4.0 | 14 | Δ | 240 |

Ex.: Example
C. Ex.: Comparative Example
SPG hydroxyl group/total terminal groups = (a) / (d)
Phenolic hydroxyl group/total terminal groups (b) / (d)
Phenolic hydroxyl group/SPG hydroxyl group = (b) / (a)
(d) = (a) + (b) + (c)

to react for 220 minutes in total. After completion of the reaction, dodecylbenzenesulfonic acid tetrabutylphosphonium salt in an amount 1.5 times the catalyst amount was added to deactivate the catalyst, and then, a reaction product was outputted from the bottom of a reaction vessel under the elevated pressure of nitrogen and cut with a pelletizer with cooling it in a water tank to give pellets. The pellets were measured for a specific viscosity, and Table 2 shows the result. Further, the above pellets were evaluated for residence stability.

Then, a film was formed in the same manner as in Example 1, and the film was measured for a photoelastic constant and the number of foamed cells. Table 2 shows the results.

Comparative Example 5

86.97 Parts of SPG, 46.35 parts of BCF, 89.29 parts of diphenyl carbonate and $5.2 \times 10^{-4}$ part of sodium hydrogencarbonate as a catalyst were melted by heating them to a resin temperature of 150° C. in nitrogen atmosphere. Then, the final vacuum degree was adjusted to 10 kPa over 10 minutes, and they were allowed to react by heating them to a resin temperature of 160° C. Then, the temperature was increased to a final resin temperature of 190° C. at a rate of 60° C./hour, and the pressure reduction degree was adjusted to 2 kPa over 10 minutes. Further, the temperature was increased to a final resin temperature of 225° C. at a rate of 30° C./hour, the final vacuum degree was adjusted to 1 kPa, further, the final resin temperature was adjusted to 280° C. at a rate of 30° C./hour, the final vacuum degree was adjusted to 133 Pa, and they were allowed to react for 220 minutes in total. After completion of the reaction, dodecylbenzenesulfonic acid tetrabutylphosphosphonium salt in an amount 1.5 times the catalyst amount was added to deactivate the catalyst, and then, a reaction product was outputted from the bottom of a reaction vessel under the elevated pressure of nitrogen and cut with a pelletizer with cooling it in a water tank to give pellets. The pellets were measured for a specific viscosity, and Table 2 shows the result. Further, the above pellets were also evaluated for residence stability.

Then, a film was formed in the same manner as in Example 1, and the film was measured for a photoelastic constant and the number of foamed cells. Table 2 shows the results.

Comparative Example 6

86.97 Parts of SPG, 46.35 parts of BCF, 89.29 parts of diphenyl carbonate and $5.2 \times 10^{-4}$ part of sodium hydrogencarbonate as a catalyst were melted by heating them to a resin temperature of 150° C. in nitrogen atmosphere. Then, the final vacuum degree was adjusted to 10 kPa over 10 minutes, and they were allowed to react by heating them to a resin temperature of 160° C. Then, the temperature was increased to a final resin temperature of 190° C. at a rate of 60° C./hour, and the pressure reduction degree was adjusted to 2 kPa over 10 minutes. Further, the temperature was increased to a final resin temperature of 225° C. at a rate of 30° C./hour, the final vacuum degree was adjusted to 1 kPa, further, the final resin temperature was adjusted to 270° C. at a rate of 30° C./hour, the final vacuum degree was adjusted to 133 Pa, and they were allowed to react for 300 minutes in total. After completion of the reaction, dodecylbenzenesulfonic acid tetrabutylphosphonium salt in an amount 1.5 times the catalyst amount was added to deactivate the catalyst, and then, a reaction product was outputted from the bottom of a reaction vessel under the elevated pressure of nitrogen and cut with a pelletizer with cooling it in a water tank to give pellets. The pellets were measured for a specific viscosity, and Table 2 shows the result. Further, the above pellets were also evaluated for residence stability.

Then, a film was formed in the same manner as in Example 1, and the film was measured for a photoelastic constant and the number of foamed cells. Table 2 shows the results.

Comparative Example 7

86.97 Parts of SPG, 27.95 parts of bisphenol A, 89.29 parts of diphenyl carbonate and $5.2 \times 10^{-4}$ part of sodium hydrogencarbonate as a catalyst were melted by heating them to a resin temperature of 150° C. in nitrogen atmosphere. Then, the final vacuum degree was adjusted to 10 kPa over 10 minutes, and they were allowed to react by heating them to a resin temperature of 160° C. Then, the temperature was increased to a final resin temperature of 190° C. at a rate of 60° C./hour, and the pressure reduction degree was adjusted to 2 kPa over 10 minutes. Further, the temperature was increased to a final resin temperature of 225° C. at a rate of 30° C./hour, the final vacuum degree was adjusted to 1 kPa, further, the final, resin temperature was adjusted to 270° C. at a rate of 30° C./hour, the final vacuum degree was adjusted to 133 Pa, and they were allowed to react for 300 minutes in total. After completion of the reaction, dodecylbenzenesulfonic acid tetrabutylphosphonium salt in an amount 1.5 times the catalyst amount was added to deactivate the catalyst, and then, a reaction product was outputted from the bottom of a reaction vessel under the elevated pressure of nitrogen and cut with a pelletizer with cooling it in a water tank to give pellets. The pellets were measured for a specific viscosity, and Table 2 shows the result. Further, the above pellets were also evaluated for residence stability.

Then, a film was formed in the same manner as in Example 1, and the film was measured for a photoelastic constant and the number of foamed cells. Table 2 shows the results.

Comparative Example 8

86.97 Parts of SPG, 38.06 parts of 1,1-bis(4-hydroxyphenyl)-3,3-5-trimethylcyclohexane, 89.29 parts of diphenyl carbonate and $5.2 \times 10^{-4}$ part of sodium hydrogencarbonate as a catalyst were melted by heating them to a resin temperature of 150° C. in nitrogen atmosphere. Then, the final vacuum degree was adjusted to 10 kPa over 10 minutes, and they were allowed to react by heating them to a resin temperature of 160° C. Then, the temperature was increased to a final resin temperature of 190° C. at a rate of 60° C./hour, and the pressure reduction degree was adjusted to 2 kPa over 10 minutes. Further, the temperature was increased to a final resin temperature of 225° C. at a rate of 30° C./hour, the final vacuum degree was adjusted to 1 kPa, further, the final resin temperature was adjusted to 270° C. at a rate of 30° C./hour, the final vacuum degree was adjusted to 133 Pa, and they were allowed to react for 300 minutes in total. After completion of the reaction, dodecylbenzenesulfonic acid tetrabutylphosphonium salt in an amount 1.5 times the catalyst amount was added to deactivate the catalyst, and then, a reaction product was outputted from the bottom of a reaction vessel under the elevated pressure of nitrogen and cut with a pelletizer with cooling it in a water tank to give pellets. The pellets were measured for a specific viscosity, and Table 2 shows the result. Further, the above pellets were also evaluated for residence stability.

Then, a film was formed in the same manner as in Example 1, and the film was measured for a photoelastic constant and the number of foamed cells. Table 2 shows the results.

TABLE 2

|  | Specific viscosity | SPG hydroxyl group/ total terminal groups | Phenolic hydroxy group/ total terminal groups | Phenolic hydroxy group/ SPG hydroxyl groups | Photo- elastic con- stant $10^{-12}$Pa | Evaluation of resi- dence stabil- ity | Number of foamed cells piece/ $m^2$ |
|---|---|---|---|---|---|---|---|
| Ex. 5 | 0.362 | 0.006 | 0.33 | 55.0 | 30 | ○ | 0 |
| Ex. 6 | 0.339 | 0.009 | 0.55 | 61.1 | 15 | ○ | 0 |
| C. Ex. 5 | 0.346 | 0.18 | 0.45 | 2.5 | 14 | x | 960 |
| C. Ex. 6 | 0.351 | 0.15 | 0.52 | 3.5 | 14 | x | 426 |
| C. Ex. 7 | 0.34 | 0.11 | 0.39 | 3.5 | 30 | Δ | 114 |
| C. Ex. 8 | 0.355 | 0.13 | 0.42 | 3.2 | 15 | Δ | 144 |

Ex. : Example
C. Ex. : Comparative Example
SPG hydroxyl group/total terminal groups = (a) / (d)
Phenolic hydroxyl group/total terminal groups (b) / (d)
Phenolic hydroxyl group/SPG hydroxyl group = (b) / (a)
(d) = (a) + (b) + (c)

In Tables 1 and 2, SPG stands for 3,9-bis(1,1-dimethyl-2-hydroxyethyl)-2,4,8,10-tetraoxaspiro[5.5]undecane, and BCF stands for 9,9-bis(4-hydroxy-3-methylphenyl)fluorene.

The SPG hydroxyl group in Tables 1 and 2 is a terminal group represented by the following formula (a).

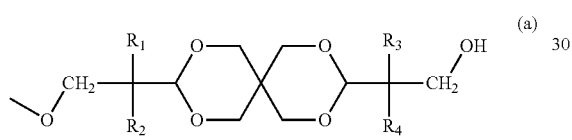

(a)

wherein $R_1$ to $R_4$ are methyl groups.

The phenolic hydroxyl group in Tables 1 and 2 is a terminal group represented by the following formula (b).

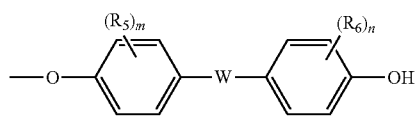

(b)

$R_5$ and $R_6$ are methyl group, each of m and n is 1, and W is a substituent represented by the following formula.

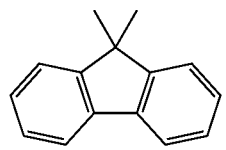

Effect of the Invention

In terminal groups of copolycarbonate of this invention, the amount of a hydroxy group (a) of cyclic acetal-based diols is small, and the amount of a phenolic hydroxyl group (b) is larger than that of hydroxy group (a) of cyclic acetal-based diols. The copolycarbonate of this invention is hence excellent in thermal stability. In the copolycarbonate of this invention, the occurrence of streaking, foaming and burning during molding can be remarkably suppressed.

INDUSTRIAL APPLICABILITY

The copolycarbonate of this invention has fewer foamed cells during molding and has a low photoelastic constant, so that it is suitable for use in optical fields.

The invention claimed is:

1. A copolycarbonate comprising 10 to 90 mol % of a unit (A) represented by the following formula (A) and 90 to 10 mol % of a unit (B) represented by the following formula (B) and having terminals satisfying the following expressions (i) and (ii),

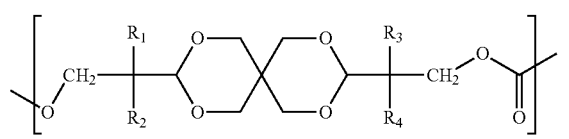

(A)

wherein each of $R_1$ to $R_4$ is independently a hydrogen atom or an alkyl group having 1 to 10 carbon atoms,

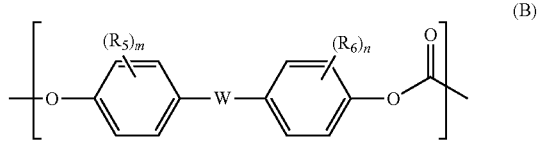

(B)

wherein each of $R_5$ and $R_6$ is independently a halogen atom or a hydrocarbon group having 1 to 10 carbon atoms, the hydrocarbon group may contain an aromatic group, each of m and n is independently an integer of 0 to 4, and W is a group selected from the following formulae,

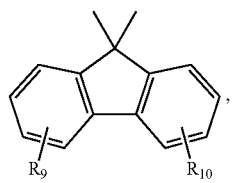

wherein each of $R_9$ and $R_{10}$ is independently a hydrogen atom, a fluorine atom, a chlorine atom, a bromine atom, an iodine atom, an alkyl group having 1 to 9 carbon atoms, an alkoxy group having 1 to 5 carbon atoms or an aryl group having 6 to 12 carbon atoms $$0.0001 < (a)/(d) < 0.1 \quad \text{(i)}$$

$$0.02 < (b)/(d) < 0.8 \quad \text{(ii)}$$

wherein (a) is an amount of terminal group represented by the following formula,

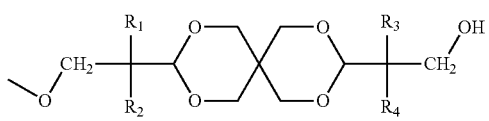

in which $R_1$ to $R_4$ are as defined in the unit (A),
(b) is an amount of terminal group represented by the following formula,

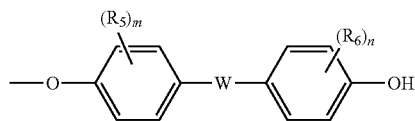

in which $R_5$, $R_6$, m, n and W are as defined in the unit (B),
(d) is a total terminal group amount and a total amount of (a), (b) and (c), and
a formula (c) is a terminal group represented by the following formula

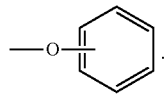

2. The copolycarbonate as recited in claim 1, wherein the terminals satisfy the following expressions (i) and (ii-1), $$0.0001 < (a)/(d) < 0.1 \quad \text{(i)}$$

$$0.02 < (b)/(d) < 0.5 \quad \text{(ii-i)}$$

wherein (a), (b) and (d) are as defined in the expressions (i) and (ii).

3. The copolycarbonate as recited in claim 1, wherein the terminals satisfy the following expression (iii), $$5 < (b)/(a) < 1000 \quad \text{(iii)}$$

wherein (a) and (b) are as defined in the expressions (i) and (ii).

4. The copolycarbonate as recited in claim 1, wherein the unit (A) is a unit (A1) represented by the following formula

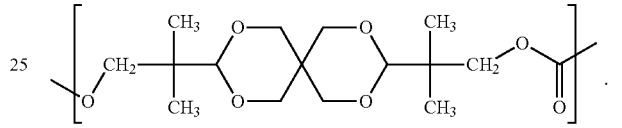

* * * * *